United States Patent [19]

Nakama et al.

[11] Patent Number: 4,896,317

[45] Date of Patent: Jan. 23, 1990

[54] SUPERVISORY SYSTEM FOR A PRIMARY GROUP DIGITAL TRANSMISSION LINE

[75] Inventors: Noboru Nakama, Fussa; Hideyuki Motoori, Yokohama; Atsushi Suzuki, Yokosuka; Eiji Sugawara, Yokohama; Naoyuki Kato, Kawasaki, all of Japan

[73] Assignee: Fujitsu Limited, Kawasaki, Japan

[21] Appl. No.: 155,139

[22] Filed: Feb. 11, 1988

[30] Foreign Application Priority Data

Feb. 20, 1987 [JP] Japan .................................. 62-038916
May 15, 1987 [JP] Japan .................................. 62-118134

[51] Int. Cl.$^4$ ........................................... H04B 17/00
[52] U.S. Cl. .................................................. 370/13.1
[58] Field of Search ........................ 370/13.1, 17, 97; 371/22

[56] References Cited

U.S. PATENT DOCUMENTS

| | | | |
|---|---|---|---|
| 3,739,098 | 6/1973 | Camiciottoli et al. ............. | 370/13.1 |
| 4,069,402 | 1/1978 | Mantovani et al. ................. | 370/13.1 |
| 4,278,850 | 7/1981 | Sato et al. ........................... | 370/13.1 |
| 4,402,075 | 8/1983 | Bargeton et al. ................... | 370/13.1 |

Primary Examiner—Robert L. Griffin
Assistant Examiner—Melvin Marcelo
Attorney, Agent, or Firm—Staas & Halsey

[57] ABSTRACT

A supervisory system for a primary group digital transmission line wherein a terminal repeater transmits, over a supervisory line, address information designating an intermediate repeater and line within the intermediate repeater to be monitored while the line is in a normal, in-service condition. The terminal repeater and intermediate repeaters are cascade connected by way of the supervisory line. The terminal repeater and each of the intermediate repeaters include amplifiers that receive and send information along the transmission line, and have a monitor output. The monitor output is processed by an error monitor within the terminal repeater and in each of the intermediate repeaters and the results of the error monitoring provided to the supervisory line in response to polling by the terminal repeater.

4 Claims, 12 Drawing Sheets

| CODE | ERROR CONDITION (OUTPUT OF ERROR MONITOR) | | | | | | |
|---|---|---|---|---|---|---|---|
| | $10^{-3}$ | $10^{-4}$ | $10^{-5}$ | $10^{-6}$ | $10^{-7}$ | | |
| 0  0  0 | 1 | 1 | 1 | 1 | 1 | 1 | NORMAL |
| 0  0  1 | 1 | 1 | 1 | 1 | 1 | 0 | INPUT SIGNAL OFF |
| 0  1  0 | 1 | 1 | 1 | 1 | 0 | 1 | ERROR $-10^{-7}$ |
| 0  1  1 | 1 | 1 | 1 | 0 | 1 | 1 | ERROR $-10^{-6}$ |
| 1  0  0 | 1 | 1 | 0 | 1 | 1 | 1 | ERROR $-10^{-5}$ |
| 1  0  1 | 1 | 0 | 1 | 1 | 1 | 1 | ERROR $-10^{-4}$ |
| 1  1  0 | 0 | 1 | 1 | 1 | 1 | 1 | ERROR $-10^{-3}$ |

FIG. 6(a)

OUTPUT OF MONITOR

FIG. 6(b)

OUTPUT OF B/U — DATA+ (TTL)

FIG. 6(c)

DATA− (TTL)

CLK

OUTPUT OF EM

INPUT OFF
$10^{-3}$ ERROR
$10^{-4}$ ERROR
$10^{-5}$ ERROR

NORMAL : L (TTL)
DETECT : H (TTL)

FIG. 6(d)

OUTPUT OF CPU | SEND ADDRESS REPEATER NUMBER | LINE NUMBER | CODE |
START BIT — STOP BIT

FIG. 6(e)

OUTPUT OF FSK

|←— 1.3 kHz —→|←— 2.1 kHz —→|
1　　　　　　　　0　　　DIGITAL SIGNAL

SUPERVISORY SYSTEM FOR A PRIMARY GROUP DIGITAL TRANSMISSION LINE

BACKGROUND OF THE INVENTION

Figure 1:
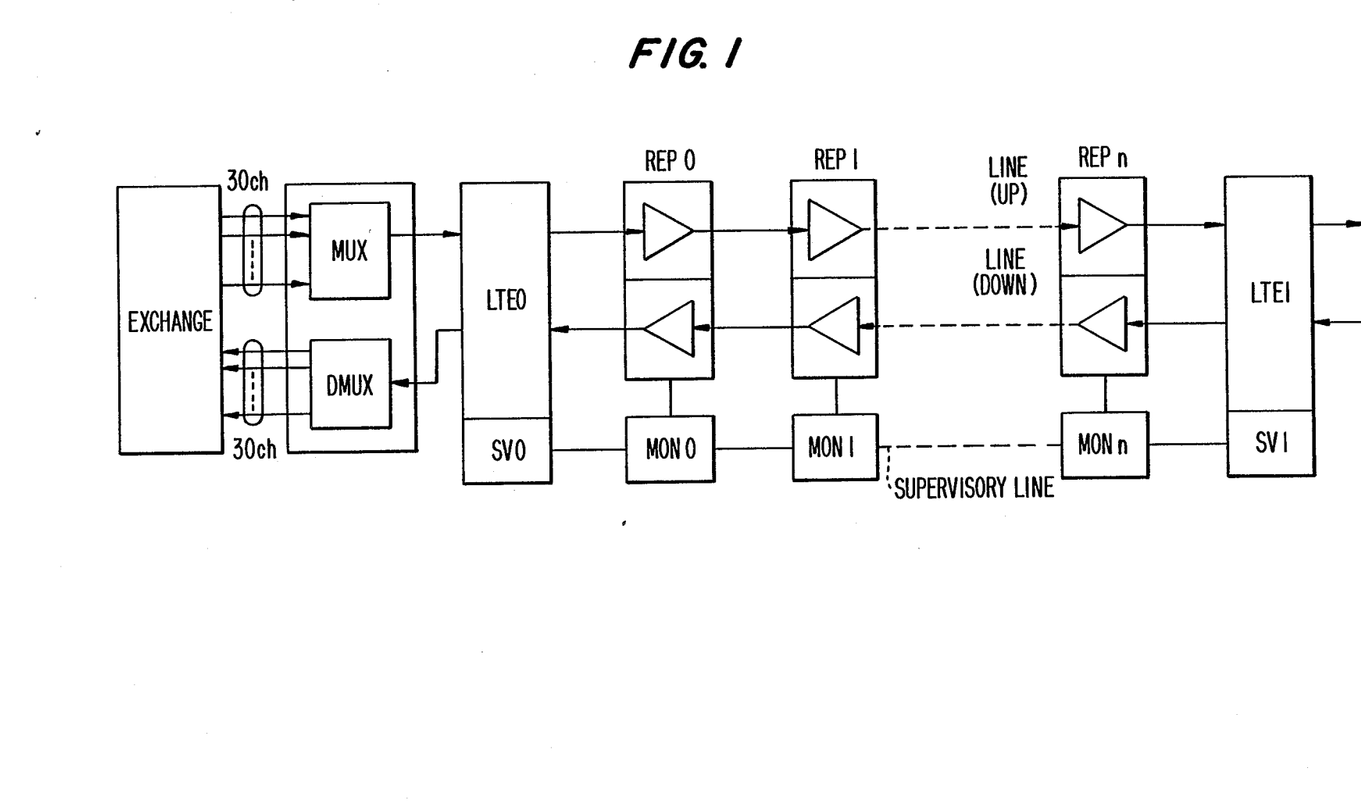
FIG. 1 is a block diagram of a primary group transmission line system.

The present invention relates to a supervisory system for a primary group digital transmission line system, such as a PCM-30 channel or PCM-24 channel system. FIG. 1 illustrates a structure of an ordinary digital transmission line (inter office junction line) of a PCM-30 channel system. Office line signals are output on outgoing trunks of an exchange. Up to 30 of these signals (channels) are multiplexed, by a multiplexer apparatus (MUX), and are provided as, for example, a 2 Mbps digital signal. The multiplexed digital signal is amplified by a terminal repeater LTE0 and is then transmitted to an up-inter office junction line comprising, for example, a 2-wire transmission line.

In general, the inter office junction line includes intermediate repeaters REP0, 1, ... n which are typically spaced 2 km apart. Therefore, a digital signal is amplified to a specified level by each intermediate repeater (REP0, 1 ... n), and is then transmitted to a terminal repeater LTE1. In the case of transmitting a signal to the terminal repeater LTE0 from the terminal repeater LTE1, a signal is transmitted through a down-inter office junction line comprising a 2-wire signal line, and is then separated into each channel by a demultiplexing apparatus (DMUX). The demultiplexed signal is then applied to the exchange through incoming trunk lines. Terminal repeaters such as LTE0 and LTE1 are provided at, for example, a point where repeater line are joined, at an inter office junction line branch point or at the input/output of office lines from an exchange as in the case of LTE0.

Since the digital transmission system illustrated in FIG. 1 must operate with high reliability, it is necessary to monitor the system for faults generated in the terminal repeaters LTE0, LTE1, intermediate repeaters REP0, 1 ... n, and the inter office junction lines. It is also necessary to detect the fault location when a fault occurs. Therefore, monitoring units MON0, 1 ... n, are respectively provided for the intermediate repeaters REP0, 1 ... n. The supervisory units SV0, SV1 are respectively provided for the terminal repeaters LTE0, LTE1. The supervisory units and the monitor units are connected by a supervisory line which is used for the monitoring process.

Such monitoring must be carried out effectively so as to detect fault locations as quickly as possible. In existing primary group PCM transmission lines, fault location of a line is performed by a pulse trio allowance test which can be performed only when the line is out-of-service.

Figure 2:
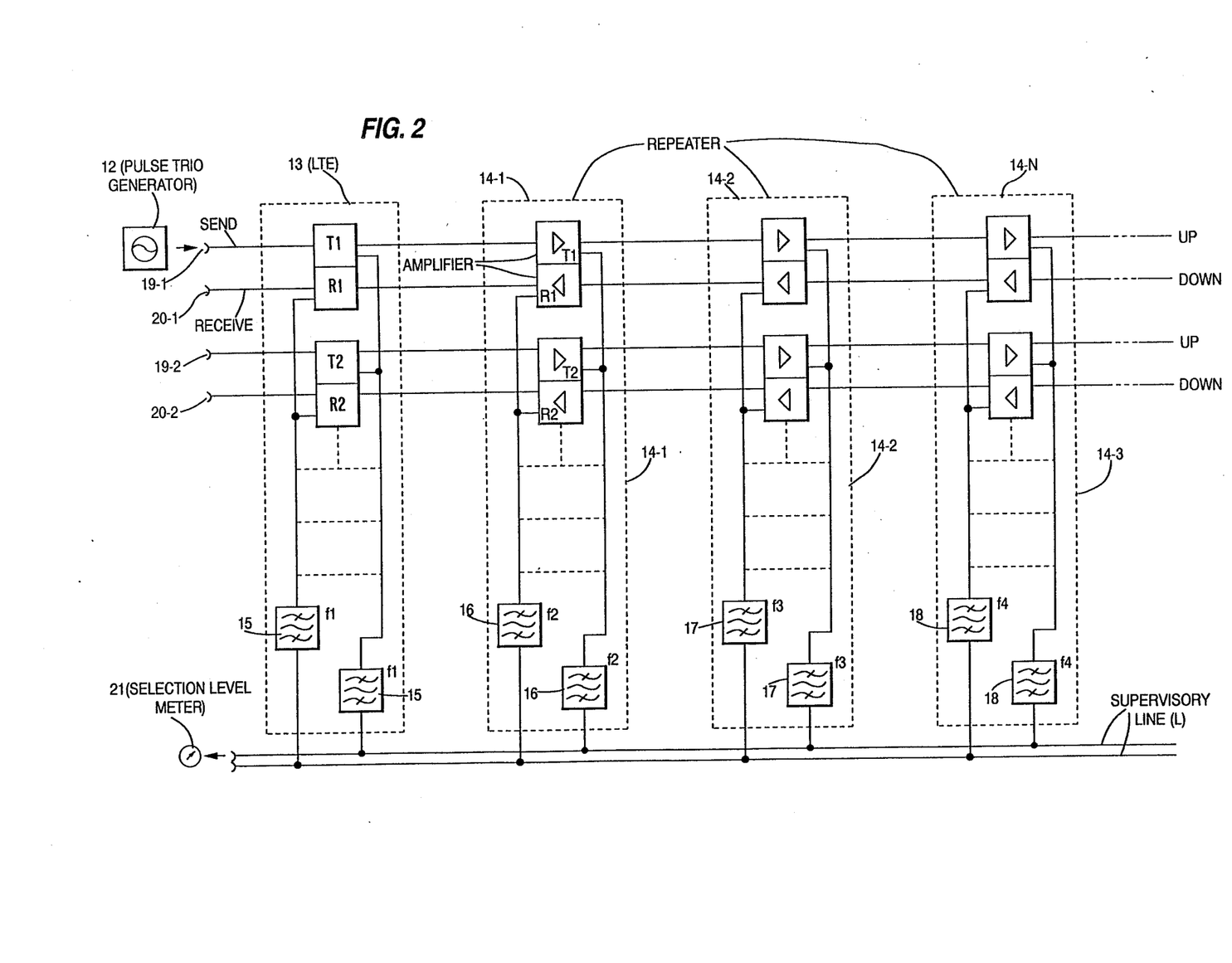
FIG. 2 is a block diagram of an existing supervisory system.
Figure 3A:
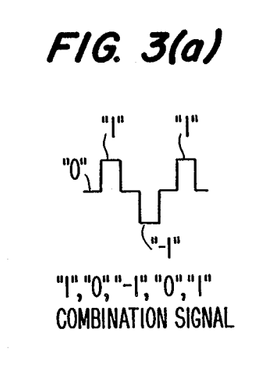
FIG. 3 illustrates output signals of a pulse trio generator in the FIG. 2 system.
Figure 3B:
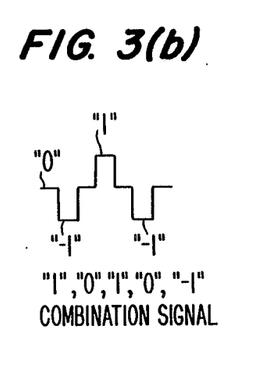
Figure 3C:
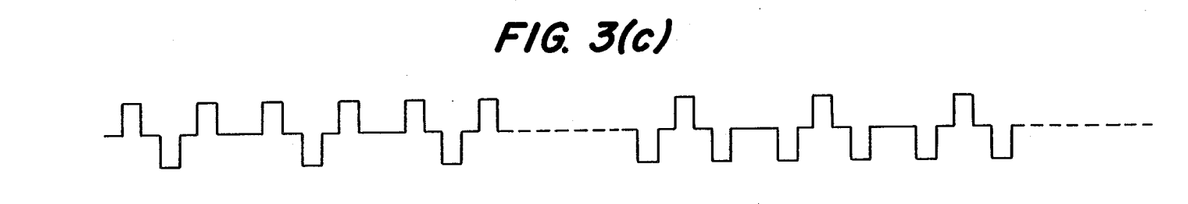
Figure 3D:
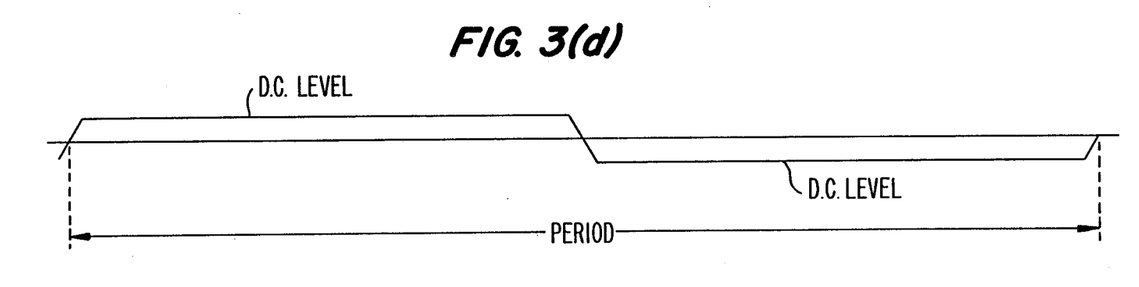

FIG. 2 is a block diagram of a structure of an existing supervisory system, and FIG. 3 illustrates output signals of the pulse trio generator used in the existing system. Referring to FIG. 2, in order to locate a fault in the terminal repeater 13, the intermediate repeaters 14-1, 14-2, 14-3 ... n (where n equals, e.g., 24 repeaters) or in the inter office junction line, the inter office junction line must first be set to an off condition; that is, placed in a non-operating condition.

To monitor the status of the terminal repeater 13, an output of the pulse trio generator 12 is applied to an input terminal 19-1 of a transmitting circuit (hereinafter "T") of the terminal repeater 13. The pulse trio generator 12 changes a DC level (FIG. 3(d)) to a constant frequency signal (FIG. 3(c)) comprising pulse trio signals "1," "0," "−1," "0," "1" (FIG. 3(a)) "−1," "0," "1," "0," and "−1" (FIG. 3(b)). There are 24 typical patterns in the voice frequency band that can be obtained by changing the repetition pattern of the pulse trio signal indicated in FIGS. 3(a) and (b) (e.g., 1005 Hz–3016 Hz). For instance, a pulse trio signal, having a DC level variation frequency $f_1$, (for example, 3016 Hz) is applied to the input terminal 19-1 of the terminal repeater 13. This signal passes through $T_1$ and is applied to a band-pass-filter (BPF) 15, which allows signals having the frequency $f_1$, and neighboring frequencies to pass. The output of BPF 15 is applied to a selection level meter 21. The selection level meter 21 measures the level of the received signal having the frequency $f_1$. This level is then compared to the applied signal level output from the pulse trio generator 12. When the applied signal level is equal to the received signal level measured by the selection level meter, there is no fault in $T_1$. On the contrary, if the signal level measured by the selection level meter is different from that of the applied signal level by more than a specified amount, there is a fault in $T_1$. Fault location detection can also be applied in the same manner to $T_2$ of the terminal repeater 13 by applying an output of the pulse trio generator to the input generator 19-2.

Next, such fault location is conducted for the intermediate repeaters 14-1, 14-2 ... 14-n. First, a pulse trio signal having a DC level variation frequency $f_2$ (e.g., 2792 Hz) is applied to the input terminal 19-1. The band-pass-filter BPF 15 of the terminal repeater 13 does not pass the frequency $f_2$. Band-pass-filter BPF 16, however, does pass the frequency $f_2$. The signal therefore passes through $T_1$ of the intermediate repeater 14-1 and then to the selection meter 21.

In the selection meter 21, the applied signal level output from the pulse trio generator 12 is compared to the received signal level measured by the selection level meter. Fault location in $T_1$ of intermediate repeater 14-1 is conducted as explained above. Such fault location is also conducted for $T_2$ and other repeaters up to, for example, 36 units. A maximum of 24 repeaters (terminal and intermediate) can be included in the system when an intrinsic frequency is assigned to each repeater. This is because there can be a total of 24 different frequencies generated by the pulse trio generator 12.

Fault location detection for a receiving circuit (hereinafter "R") can also be realized by applying the signals having frequencies $f_1, f_2 ... f_{24}$, as explained above to the proper input terminals of each repeater.

The inter office junction line is usually very long and includes many repeaters. The repeaters are needed because the repeating distance for a 2 MHz PCM transmission line is approximately 2 km. The test of successive repeaters is conducted by changing the frequency of the applied signal output from the pulse trio generator 12, which is used as a supervisory signal. As noted above, the frequency of the applied signal (i.e., the supervisory signal) can be any one of 24 frequencies within the voice frequency band of approximately 1 kHz–3 kHz. Thus, each repeater is assigned one of the 24 frequencies, and the repeaters are individually tested from, for example, the terminal side. Therefore, the FIG. 2 system can test no more than 24 repeaters.

In addition to the above limitation, the supervisory line L does not include any amplifiers and therefore attenuates the pulse trio signal provided by the pulse trio generator 12. If supervisory equipment is provided at each end of the transmission line, then a supervisory line L from each end need only be ½ the full distance between the offices. The problem of signal attenuation limits the maximum distance between offices. Also, the above test is carried out by applying the pulse trio signal to the transmission line system. As a result, the test cannot be conducted while the system is in service. Monitoring during normal, in-service conditions is impossible, and therefore, service must be suspended in order to test the system.

SUMMARY OF THE INVENTION

It is an object of the present invention to provide a primary group digital transmission line which can provide a supervisory operation while the line is in a normal, in-service condition.

It is another object of the present invention to provide a supervisory system which is not restricted in the number of repeaters that can be used.

It is a further object of the present invention to provide a supervisory system that does not restrict the length of the transmission line.

DESCRIPTION OF THE PREFERRED EMBODIMENTS

Figure 4:
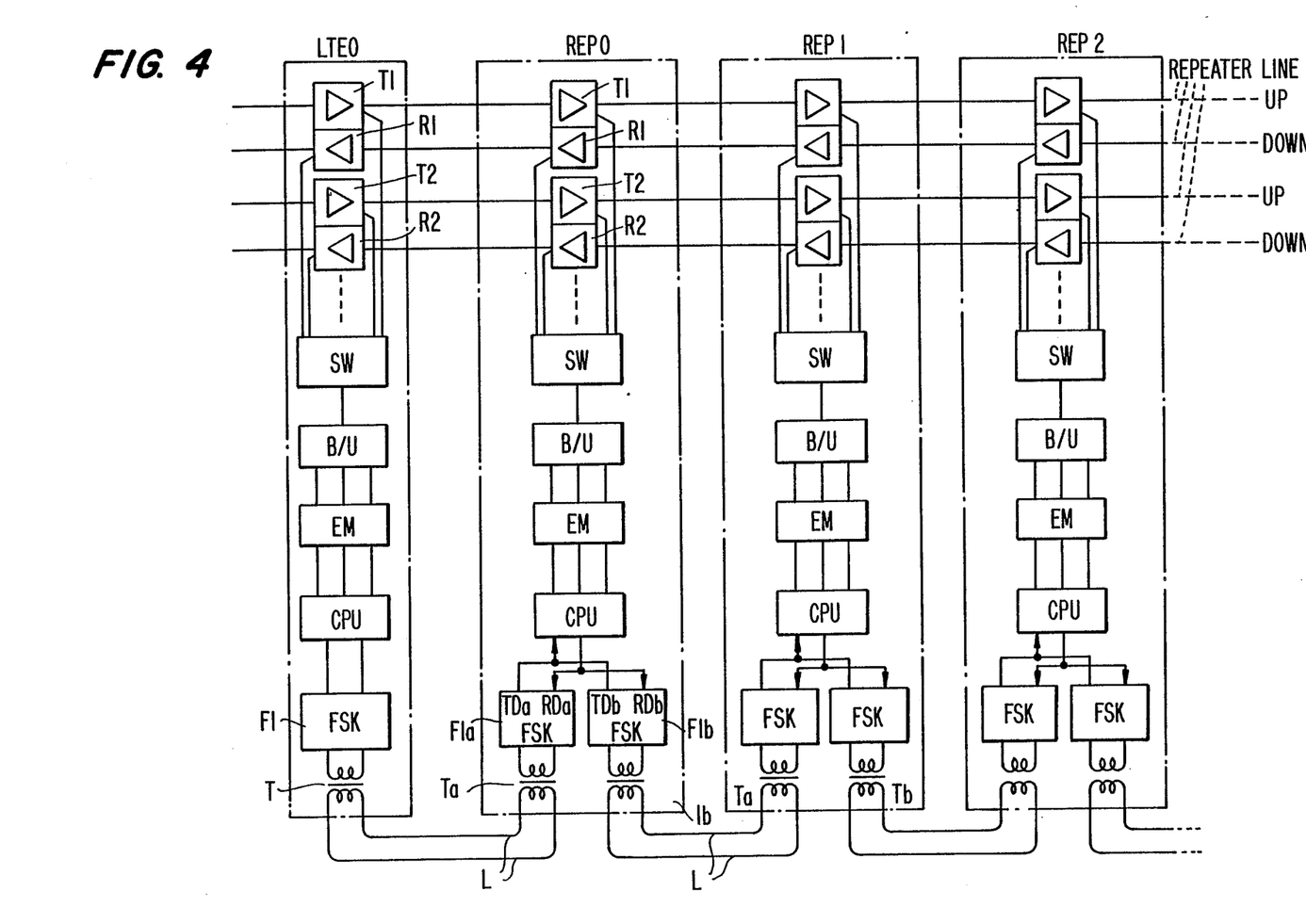
FIG. 4 is a block diagram of a primary group transmission line system according to the present invention.

The present invention enables supervisory operation of repeaters and transmission lines while they are operating in a normal, in-service condition. The present invention eliminates the problem of signal attenuation by effectively including an amplifying function in a supervisory line. FIG. 4 is a block diagram of a primary group transmission line system according to the present invention. In FIG. 4 LTE0 is a terminal repeater operating as a supervisory terminal, and REP0, REP1, REP2, ... are intermediate repeaters in the transmission line (inter office junction line). Each repeater (terminal and intermediate) comprises an amplifier, and the transmission line is a bi-directional 2-wire transmission line. Therefore, the amplifier comprises a pair of amplifiers such as amplifiers $T_1$ for an up-line of the 2-wire line, and amplifier $R_1$ for a down-line of the 2-wire line. Because the transmission lines include several lines a plurality of amplifiers $T_2$, $R_2$, $T_3$, $R_3$, etc. are required.

Figure 5:
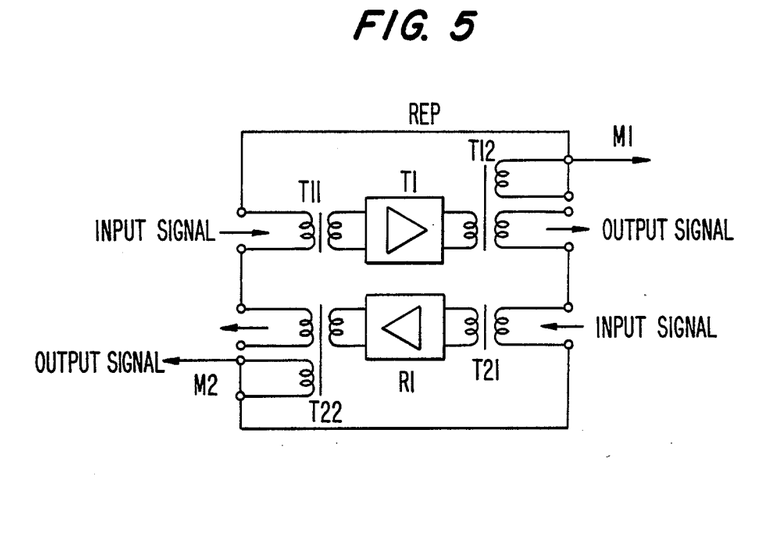
FIG. 5 is a circuit diagram of an amplifying circuit of the FIG. 4 system.

As shown in FIG. 5, each amplifier includes a three coil transformer such as transformer $T_{12}$. Each transformer provides a monitor output signal such as $M_1$. A switch SW selects a monitor output signal from among those output by the amplifiers $T_1$, $R_1$, $T_2$, etc. A converter B/U converts a bipolar output of the switch SW (the transmission line transmits bipolar signals, i.e., an AMI signal) into a unipolar signal. An error monitor EM obtains an error rate based on the received output of the converter B/U.

In FIG. 4, reference letters CPU designate a central processor unit; reference letters FIa, FIb identify FSK interface modulator/demodulators for frequency shift keying; and reference letters Ta and Tb denote transformers. These elements form a FSK modem monitoring unit.

Each of the intermediate repeaters REP0, REP1, REP2, etc. has the same structure. The terminal unit LTE0 is slightly different but also includes a central processor unit CPU, a FSK interface FI and a transformer T. These elements, however, operate as a supervisory terminal unit. As shown in FIG. 4, each transformer is cascade-connected in the sequence: transformer T of supervisory terminal unit LTE0 and transformer Ta of intermediate repeater REP0; transformer Tb of intermediate repeater REP0 and transformer Ta of intermediate repeater REP1, etc. In this case, the supervisory line L is a 2-wire bi-directional transmission line.

Referring to FIG. 5, the amplifiers $T_1$ and $R_1$ of each repeater include input transformers $T_{11}$ and $T_{21}$, and output transformers $T_{12}$ and $T_{22}$. As noted above, the output transformers $T_{12}$ and $T_{22}$ are three-coil type transformers. In transformer $T_{12}$, one coil provides the monitor output signal $M_1$, and in transformer $T_{22}$ one coil provides the monitor output signal $M_2$. The switch SW (FIG. 4) selects one of these monitor output signals.

As shown in FIG. 4, error rate information can be provided by each repeater (terminal and intermediate). This information can be accessed by the CPU of a terminal unit, for example, the unit LTE0. This is accomplished by a pair of FSK modems in each intermediate repeater and cascade-connecting these modems. Since the information on the supervisory line is FSK-modulated at each repeater, the distance between repeaters can be extended. Also, data on each transmission line can be directly monitored by an error monitoring circuit EM which monitors outputs $M_1$ and $M_2$ from transformers $T_{12}$ and $T_{22}$ for the existence of data errors. Such supervision/monitoring takes place while the transmission line is in a normal, in-service condition.

Figure 6A:
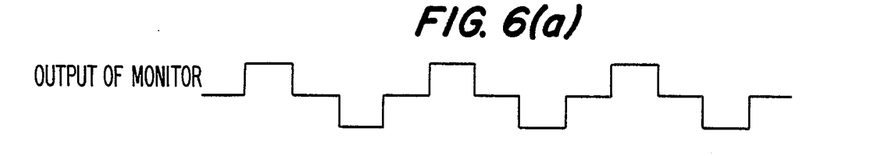
FIGS. 6(a)–(e) illustrate various signal waveforms of the FIG. 4 system.
Figure 6B:
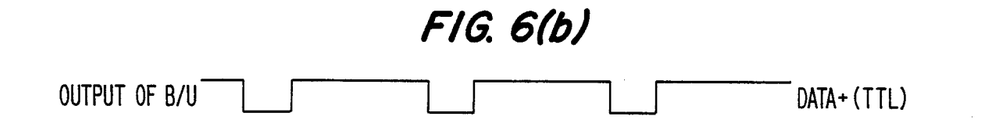
Figure 6C:
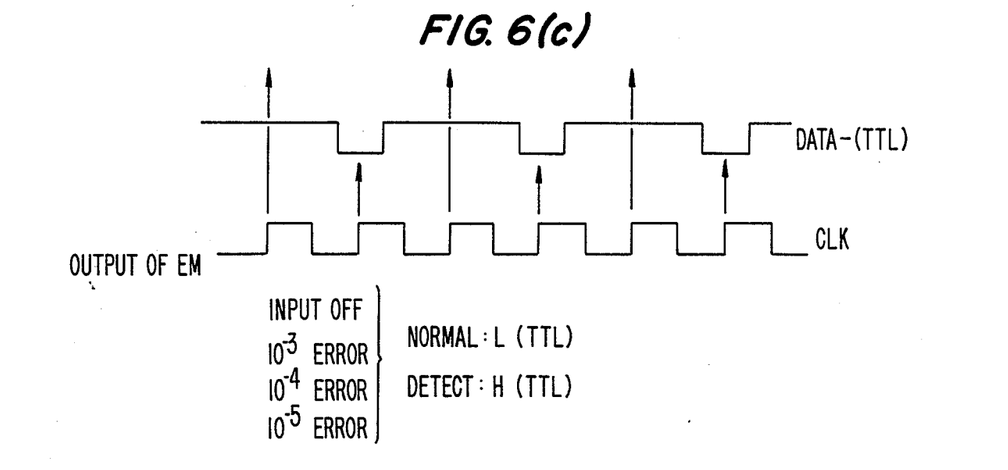
Figure 7:
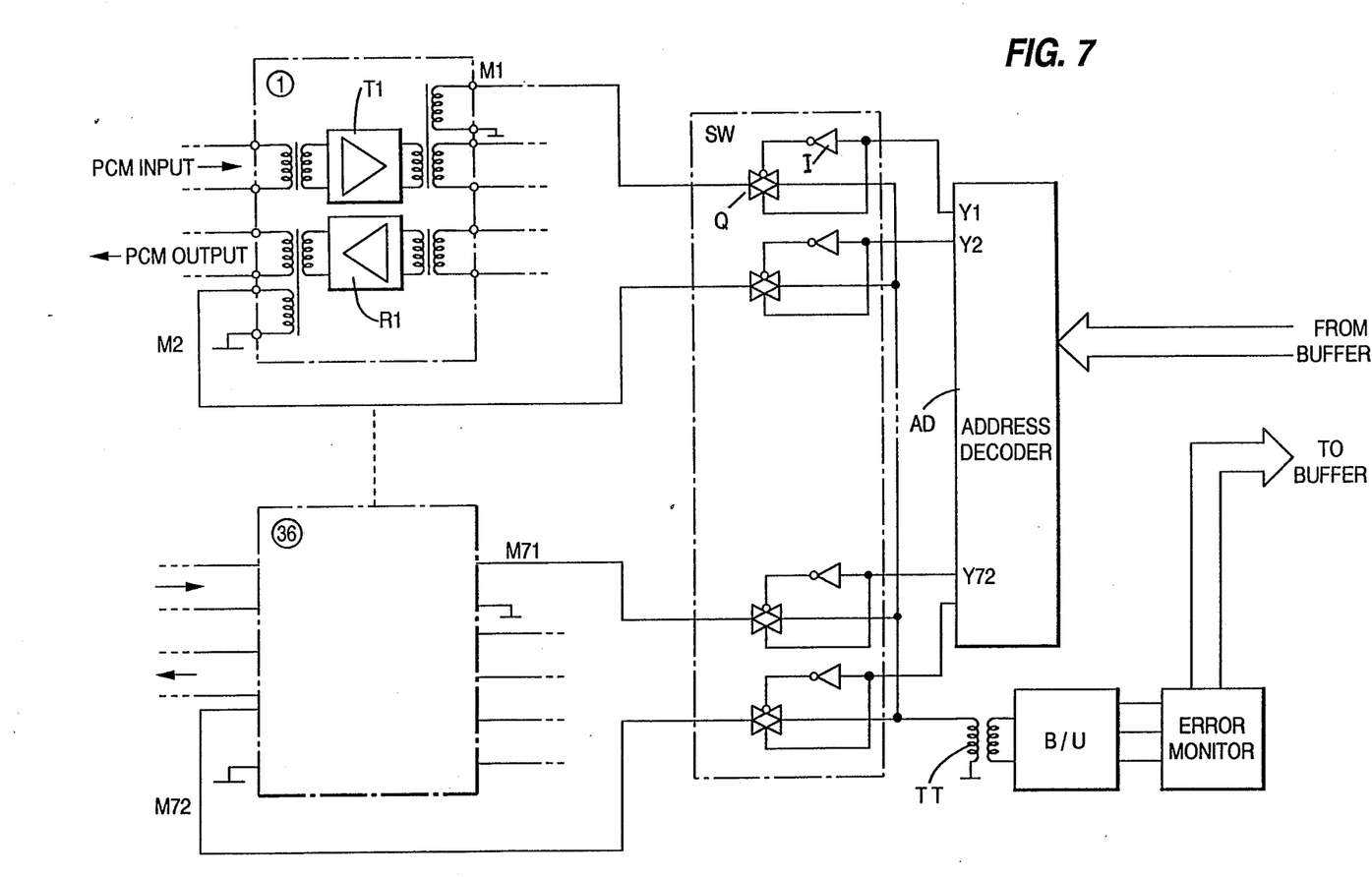
FIG. 7 is a block diagram of a repeater according to the present invention.

The structure and operation of the supervisory system according to the present invention will be explained with reference to FIGS. 4–8. The system extracts only one monitor output signal while the transmission line is in a normal, in-service condition. Specifically, the analog switch SW can selectively provide any one of the monitor output signals (M1, M2) to the converter B/U. The converter B/U applies the converted unipolar signal to the error monitor EM as shown in FIG. 7. FIG. 6(a) illustrates a monitor output signal M and FIG. 6(b) illustrates an output of the converter B/U. The error monitor EM detects H (high) and L (low) levels output by the B/U converter, using a clock signal CLK recovered by the converter B/U (FIG. 6(c)). The error monitor EM detects error rates such as input OFF, $10^{-3}$ error $10^{-4}$ error and $10^{-5}$ error (see, e.g., FIG. 12).

Figure 6D:
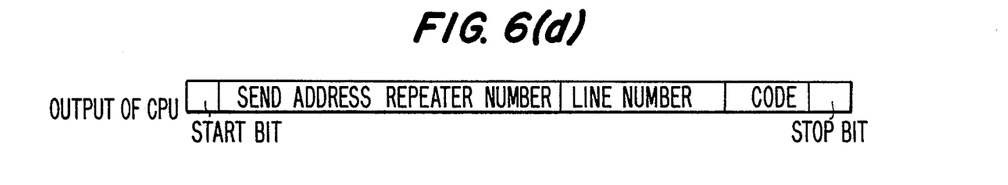
Figure 6E:
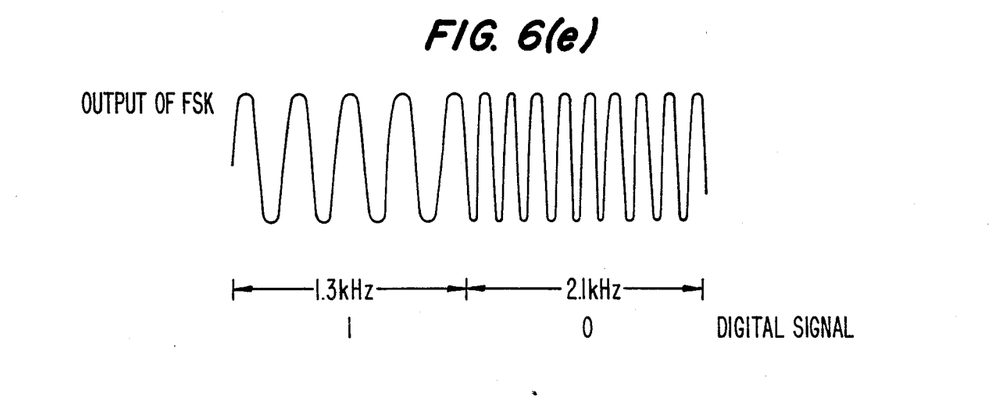

The error monitor EM provides signals that are alternatively positive and negative pulses in the form of an AMI signal. If two positive pulses or two negative pulses appear in succession, this is detected as an error. The designation $10^{-3}$ means that an error is generated once in $10^3$ pulses. The error monitor EM generates an output L (low) level under a normal (no error) condition, and generates an output H (high) level under an alarm (error) condition. The processor CPU detects the outputs of the error monitor EM and provides conditional information in a format such as shown in FIG. 6(d). FIG. 6(e) illustrates an output of the FSK interface FI. FSK-modulation of a data "1" is represented by a sine wave of 1.3 kHz and FSK-modulation of a data "0" is represented by a sine wave of 2.1 kHz.

Figure 12:
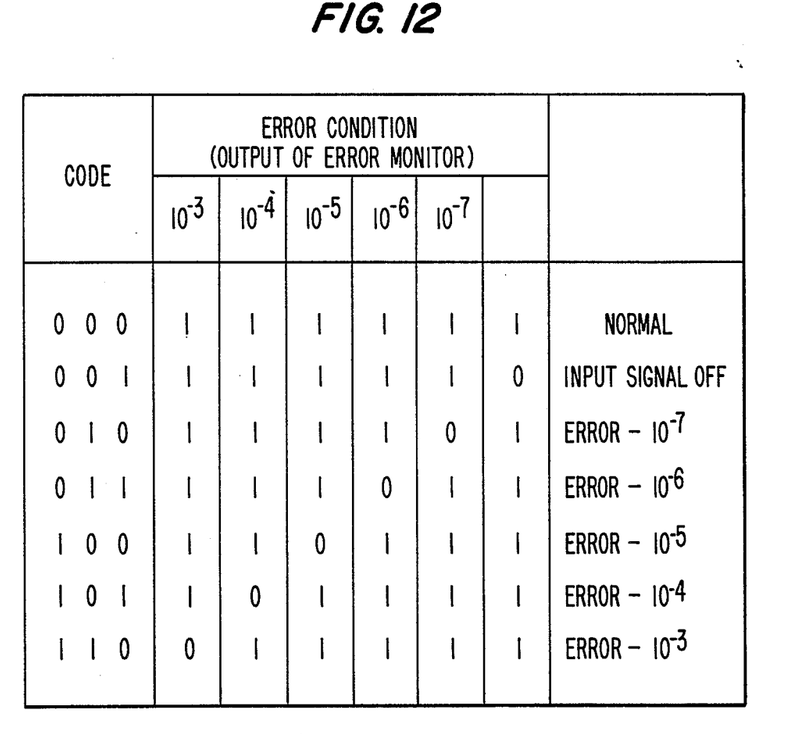
FIG. 12 is a table of output signals from an error monitor.

The error monitor provides a coded output comprising six bits of data as indicated in FIG. 12. As shown, the six bit output indicate: input OFF (no signal), $10^{-3}$, $10^{-4}$, $10^{-5}$, $10^{-6}$ and $10^{-7}$. The CPU encodes each six bit output pattern received from the error monitor EM into a three bit code as indicated in FIG. 12. This three bit code is provided by the CPU as shown in FIG. 6(d), together with a destination (send) address, a repeater number (REP0, 1, 2, etc.) a line number to be monitored ($T_1$, $R_1$, $T_2$, $R_2$, etc.). This data is transmitted by the CPU as conditional data.

The processor CPU of the LTE0 supervisory terminal provides, over the supervisory line L (FIG. 4), information such as the repeater number and the line number to be monitored in order to monitor a designated line (amplifier) in a designated repeater (terminal or intermediate). The processor of the supervisory terminal repeater collects the conditional information in the sequence of, for example, line number $T_1$ of LTE0, line number $T_1$ of REP0, line number $T_1$ of REP1 . . . line number $T_1$ of REPn, line number $R_1$, of LTE0, line number $R_1$ of REP0 . . . line number $R_1$ of REPn. With this sequence, the conditional data format is essentially the same as that obtained by eliminating the SEND ADDRESS shown in FIG. 6(d), because the repeater number has the same value as the SEND ADDRESS.

Each repeater detects and receives the information transmitted, via the supervisory line L, by the CPU in LTE0. If a repeater detects its repeater number in the information, it transmits, to the supervisory terminal (e.g., LTE0), the conditional information of the designated line together with a destination (send) address which is that of the supervisory terminal. If a repeater detects a repeater number other than its own in the information, it sends (repeats) the information to the next repeater. Since the level of the signal provided by each FSK modem (e.g., FIa, FIb) is 0 dB, the result is that the signal is substantially amplified. The problem of attenuation of the supervisory signal is thus eliminated. As a result, the supervisory line can be extended indefinitely.

Moreover, monitoring of any amplifier and the transmission line can be performed while the line is in a normal, in-service condition, because a particular test signal is not used on the transmission line. In addition, a line in the non-busy condition can also be monitored since an idle signal is usually transmitted while a line is in such a condition.

When error rates as small as $10^{-3}$, $10^{-4}$, ... $10^{-7}$, are detected, the process of a line deteriorating can be monitored. Effective and timely maintenance can therefore be performed.

In a system of the present invention, a monitor output signal is provided by an output transformer as indicated in FIG. 5 or the monitored signal can be provided by a pulse trio signal generator. Therefore, the present invention is compatible with existing systems using pulse trio signals, thus minimizing the cost of providing the present invention to existing systems.

FIG. 7 is a block diagram of a repeater according to the present invention, such as the terminal repeater LTE0. FIG. 7 illustrates 36 2-wire lines, 36 pairs of amplifiers $T_1$, $R_1$, . . . $T_{36}$ and $R_{36}$ are needed for these lines. These amplifiers provide 72 monitor output signals. The analog switch SW selectively provides a designated one of the 72 monitor output signals.

In FIG. 7 the reference letter Q designates a switch comprising an n-channel FET and a p-channel FET connected in parallel; and reference letter I designates an inverter for generating an inverted signal. As shown in FIG. 7, a switch Q and an inverter I can be provided for each monitor output signal. Each switch Q is controlled by a corresponding one of the selected outputs $Y_1$, $Y_2$, . . . , $Y_{72}$ generated by an address decoder AD which designates the monitor output signal to be applied to the transformer TT. The designated, i.e., selected, monitor output signal is applied to the bipolar-/unipolar converter B/U through a transformer TT. A buffer 1 (e.g., FIG. 8) provides address information to the address decoder AD. The buffer 1 receives the address information from the CPU, which in turn receives the address information from the FSK interface which includes, for example, an FSK modem, a bandpass-filter and a transformer. A supervisory terminal (e.g., LTE0), supplies address signals via its CPU to the address decoder AD of the supervisory terminal through a buffer similar to buffer 1.

Figure 8:
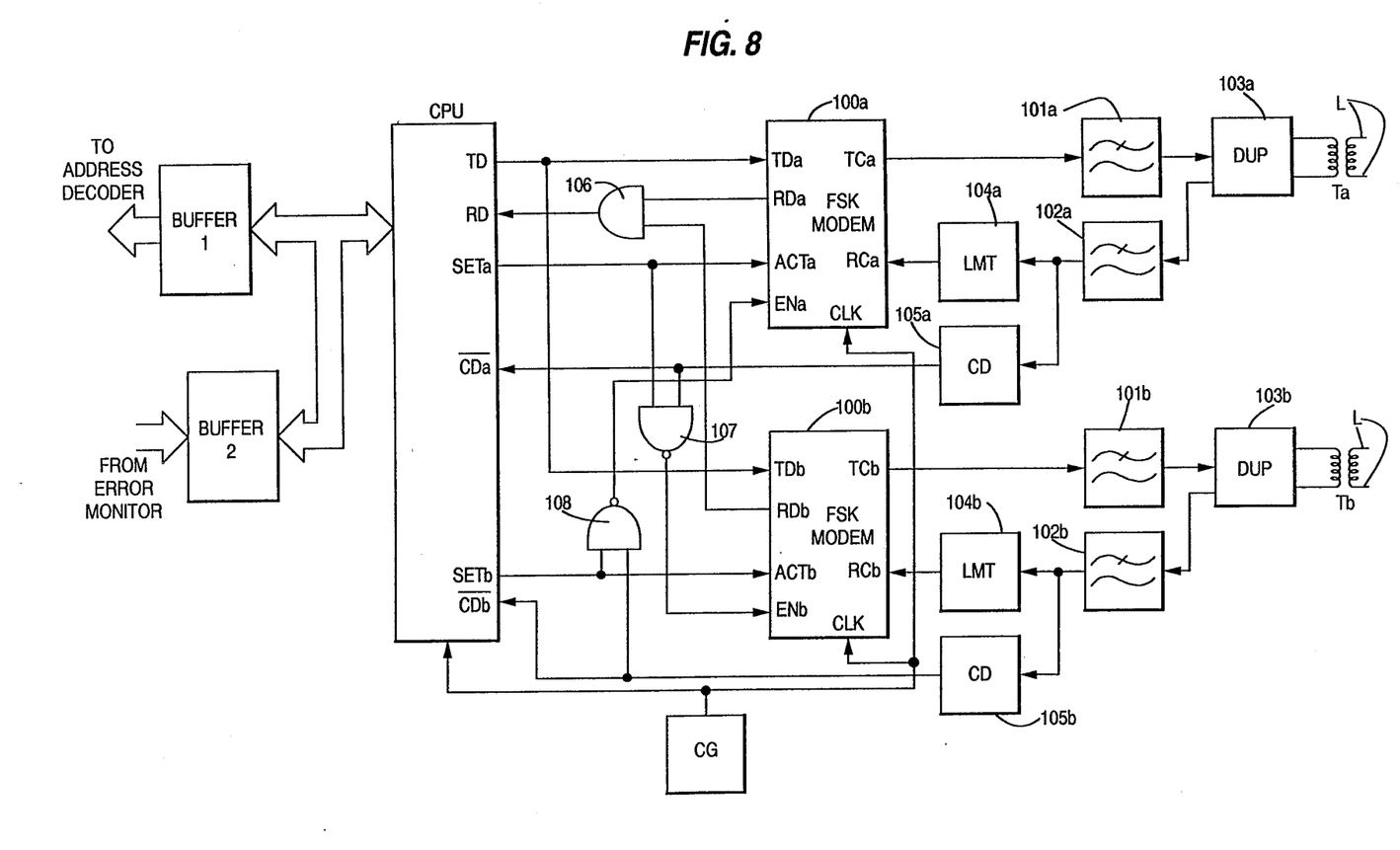
FIG. 8 is a block diagram of a transmitter/receiver of a supervisory terminal according to the present invention.

FIG. 8 is a block diagram of a transmitter/receiver of a supervisory terminal according to the present invention. In FIG. 8, Ta and Tb correspond to the transformers explained with reference to FIG. 4 and CPU corresponds to the processor shown in FIG. 4. Duplexers DUP 103a and 103b function as branching circuits to separate the receive signals and the send signals on the supervisory line L. This circuit comprises, for example, a 2-wire/4-wire converting circuit. Filters 101a, 102a, 101b and 102b filter different frequencies of FSK modulated signals, which are sent from and received by the duplexers DUP 103a and 103b. Limiters LMT 104a and LMT 104b shape sine waves respectively output from the filters 102a and 102b, into rectangular waves in accordance with an input mode requirement of FSK modems 100a and 100b. Carriers detectors CD 105a and CD 105b detect carrier frequencies in the FSK signal applied on the supervisory line L. These carrier detectors generate a L level output indicating detection of a carrier and a H level output to indicate non-detection of a carrier. The FSK modems 100a and 100b convert an analog FSK signal into a digital signal. In FIG. 8, reference letters CG represent a clock generator which generates a clock signal having a frequency of 3.68 MHz and provides this signal as a clock that drives the FSK modems 100a and 100b and the processor CPU.

Figures 9A, 9B, 9C:
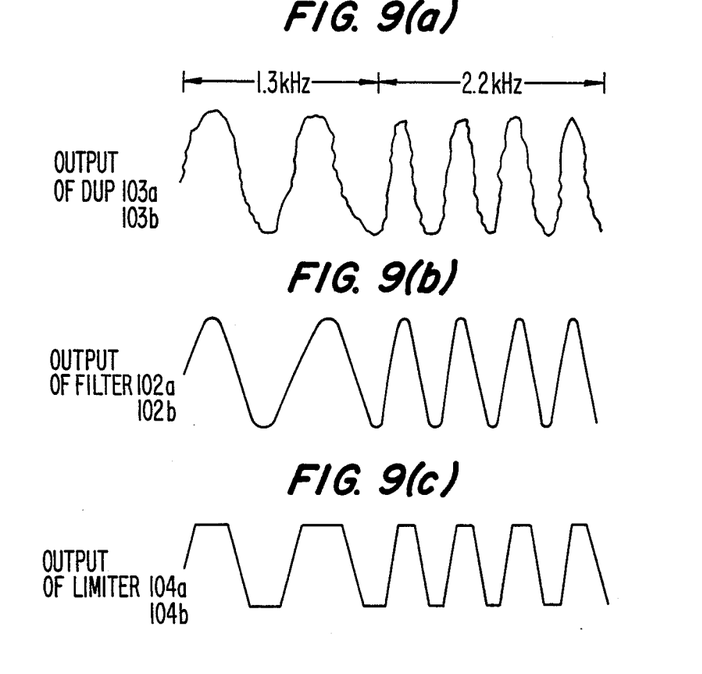
FIG. 9 is a timing diagram of a FSK input signal from a supervisory line.

Next, operations are explained with reference to FIGS. 8–11. While the CPU (FIG. 8) is in a waiting condition, the CPU sets both SETa and SETb to a H level. This places the FSK modems 100a and 100b in a receiving condition. When an FSK signal is received by the transformer Ta (which in turn receives them from, for example, LTE0), this signal is provided by the duplexer DUP 103a to filter 102a. FIG. 9(a) illustrates a signal provided by DUP 103a or 103b. After filtering by, for example, filter 102a, noise is eliminated from the FSK signal and the filtered signal corresponds to, for example, the 1.3 kHz or the 2.1 kHz sine waves shown in FIG. 9(b). That is, it represents a data "1" or a data "0". The filtered sine wave is applied to the limiter LMT 104a, which shapes the input waveform into a rectangular wave (shown in detail as a trapezoidal wave in FIG. 9(c)). This rectangular waveform conforms to an interface requirement of the input terminal RCa of the FSK modem 100a (FIG. 8).

Figure 10:
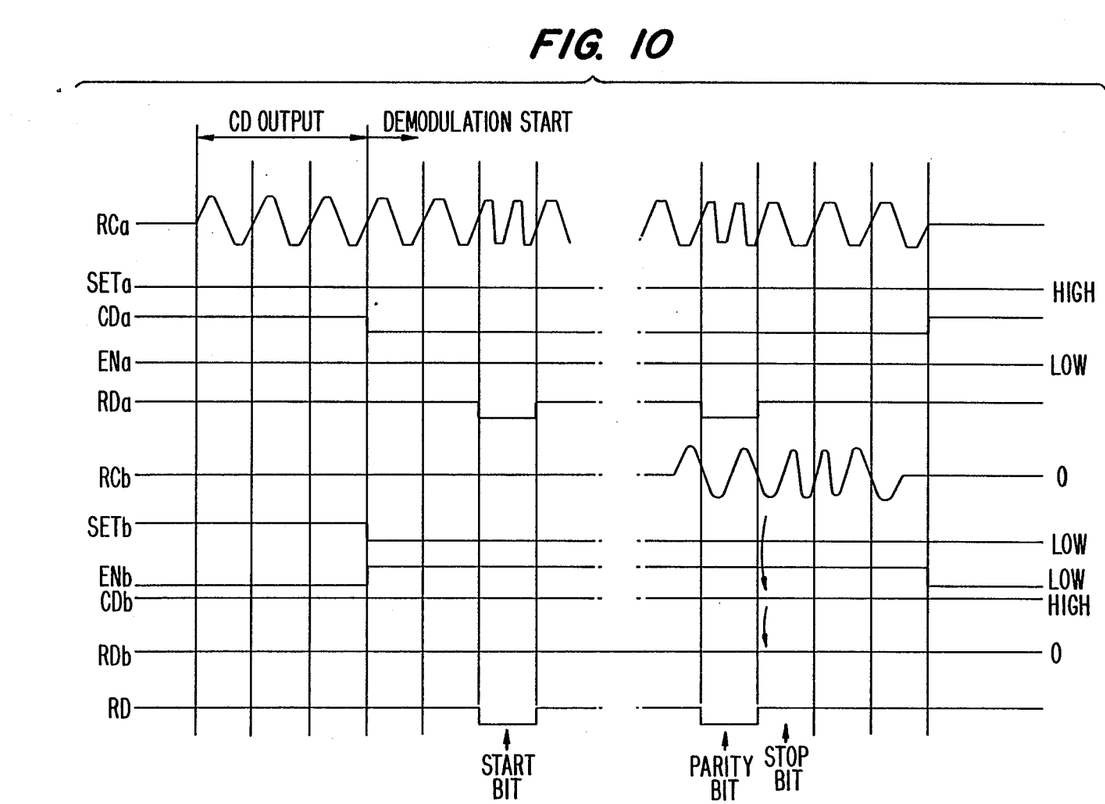
FIG. 10 is a timing diagram of data received from a supervisory line by a FSK modem.

The shaped (rectangular) signal shown in FIG. 10 (and FIG. 9(c)) is applied to the carrier detector CD 105a (FIG. 8) which provides an output CDa. When CDa is a L level, CPU sets the output SETa to a H level in order to set ACTa of FSK modem 100a to the H level and to place the FSK modem 100a in the receiving mode. The CPU also sets the output SETb to the L level in order to place the FSK modem 100b in a non-receiving mode (send mode). Therefore, an output of NAND gate 107 becomes a H level and the input ENb of FSK modem 100b becomes a H level, stopping operation of the FSK modem 100b. Simultaneously, the output of RDb is set to a H level, enabling the AND gate 106 to provide the output RDa of FSK modem 100a to the RD terminal of the CPU. An output of NAND gate 108 becomes a L level, setting ENa to a L level, placing FSK modem 100a in the operating condition. Accordingly, the FSK modem 100a converts the analog FSK signal applied to terminal RCa into digital signals (e.g., 1 and 0) and then outputs these digital signals to the CPU through the terminal RDa. After receiving the converted FSK signal, the processor CPU places the FSK modems 100a, 100b into a waiting condition.

The processor CPU receives a command via a RD input to provide a designated monitor output to a supervisory terminal. In response, the CPU sends an address signal (information) of the designated line (amplifier) to the address decoder AD to select the error monitor output signal of the designated line (amplifier). The selected error monitor output signal then passes through the switch SW and transformer TT to the error monitor EM through the converter B/U (FIG. 7).

Figure 11:
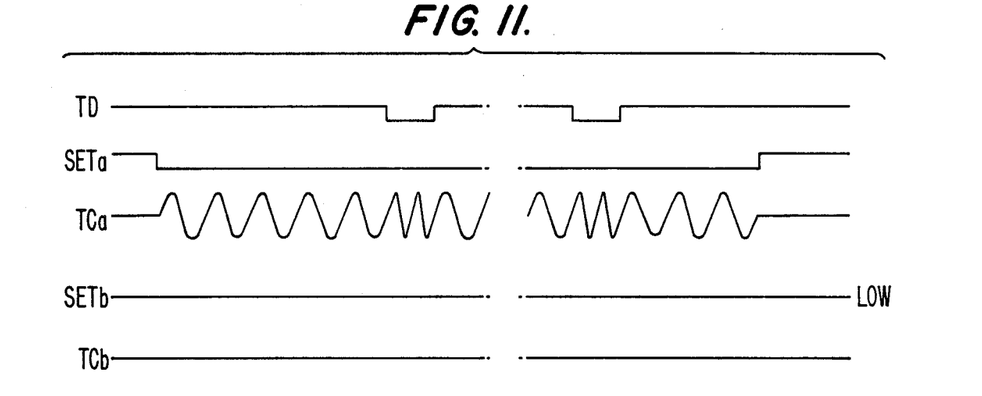
FIG. 11 is a timing diagram of data transmitted to a supervisory line by a FSK modem.

Referring to FIG. 11, the error monitor EM outputs a coded error signal (FIG. 12) to the processor. As discussed above, the CPU provides a three bit representation of this coded error signal together with other information in a format as shown in FIG. 6(d). The CPU then sets output SETa to a L level in order to set the FSK modem 100a to the sending condition. The FSK modem 100a can therefore FSK modulate the conditional information (FIG. 6(d)) from the CPU and output the conditional information to the transformer Ta. The conditional information therefore is transmitted from the CPU output terminal TD through the FSK modem 100a, filter 101a, DUP 103a and the transformer Ta. In this case, SETb is set to a L level to prevent receiving FSK signals from the transformer Tb.

If the FSK signal present at the transformer Ta is not a command for the repeater, the CPU sets SETa to a H level and SETb to a L level. The FSK modem 100b is thereby set to a sending condition. The CPU then sends (repeats) the information received via transformer Ta to Transformer Tb and thus to the next repeater.

Figure 13:
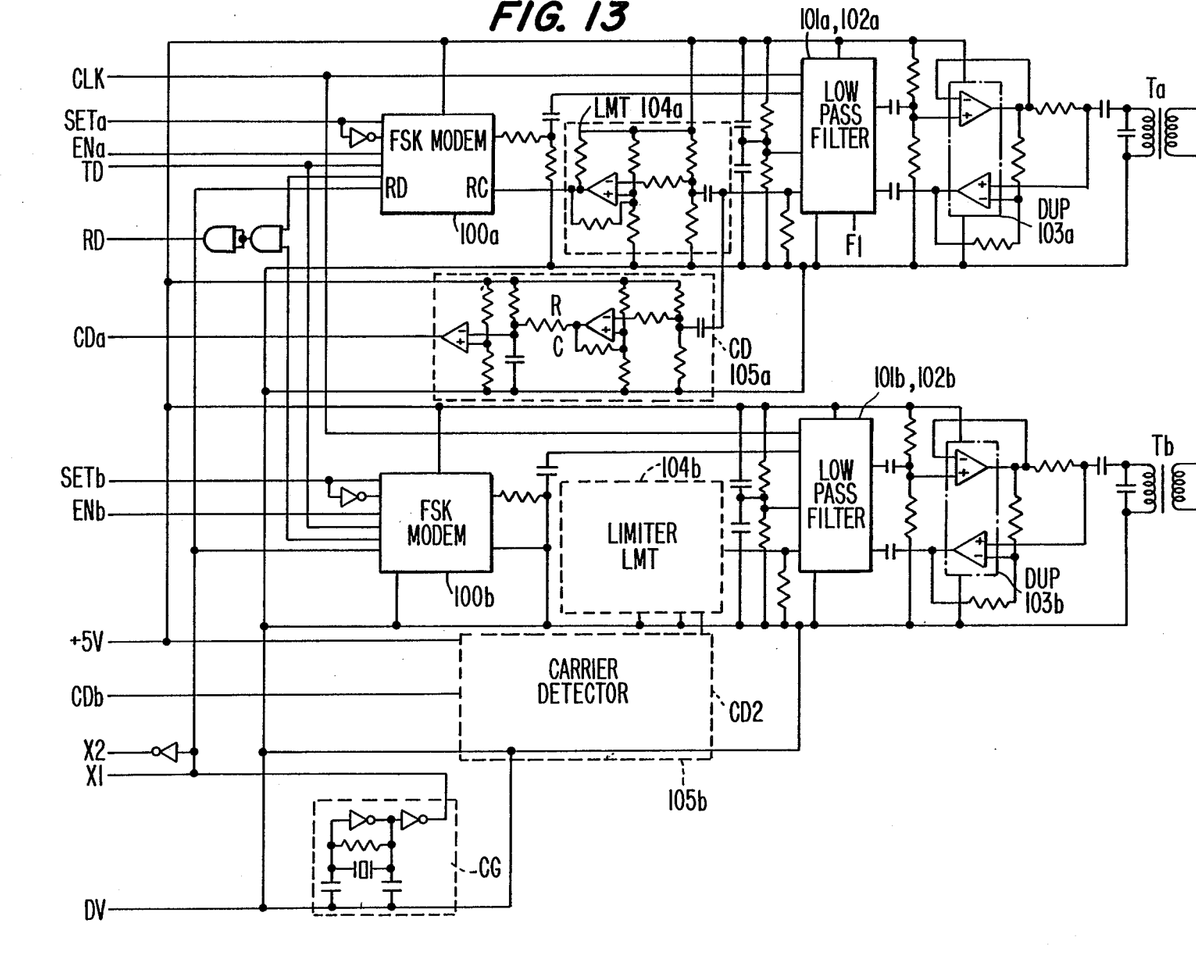
FIG. 13 is a circuit diagram of the FIG. 8 system.

FIG. 13 is a circuit diagram of the FIG. 8 system. In FIG. 13, the duplexers 103a and 103b respectively comprise 2-wire/4-wire converters. These converters comprise a pair of operational amplifiers. The filters 101a, 102a and 101b, 102b are switched capacitor filters that are switched by clock signal CLK. The clock signal CLK can have a frequency of, for example, 153.5 kHz. This frequency can be used to detect signals having frequencies of 2.2 kHz or less and it can be obtained by, for example, dividing an output of the oscillator CG.

The limiters 104a and 104b function as sine wave/rectangular wave converters which convert the output of filters 102a and 102b into rectangular waves having a duty cycle of approximately 50%. Each limiter comprises one comparator.

The carrier detectors CD 105a and 105b respectively convert the outputs of filters 102a and 102b into rectangular waves and also add a bias level to these signals. The carrier detectors integrate the converted signals using, for example, a RC network, and detect a DC level difference between a reference signal and the integrated signal. The DC level difference represents the presence or absence of a carrier. The time required to detect a carrier signal is therefore determined by the time constant of the integration RC network.

The FSK modems 100a and 100b can comprise any commercially available LSI modems. Generally, when demodulating a signal, the conversion is performed on an input signal having approximately a 50% duty cycle.

Figure 14:
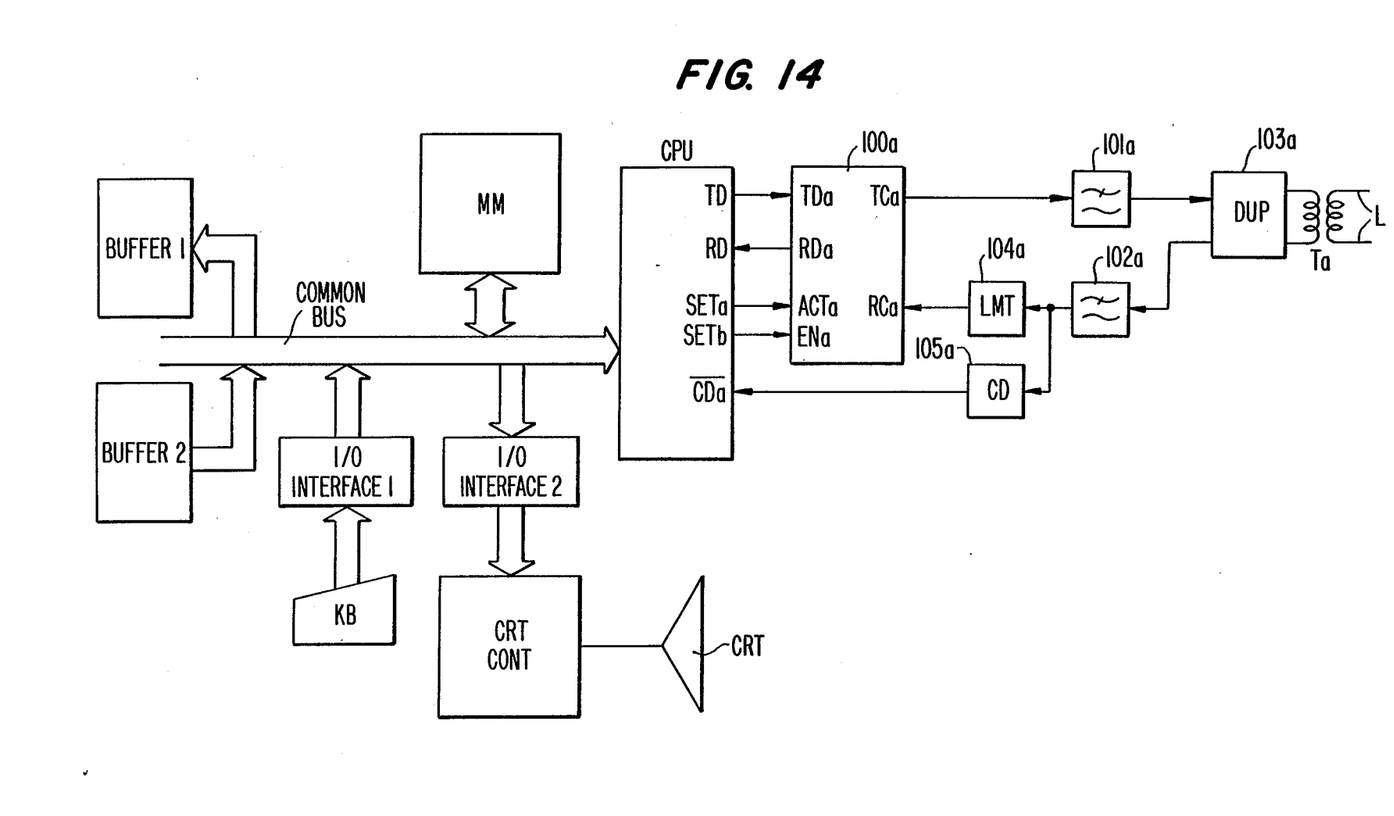
FIG. 14 is a block diagram of a terminal repeater according to the present invention.

FIG. 14 is a block diagram of a supervisory terminal repeater of the present invention; and particularly of a transmitter/receiver of the terminal repeater LTE0 of FIG. 8. As shown in FIG. 4, the LTE0 includes an FSK modem FI. As noted above, the LTE0 functions as a supervisory terminal and collects conditional information from each repeater. The construction of the LTE0 transmitter/receiver is different from that of the intermediate repeaters.

When the CPU transmits a polling signal (e.g., the address of a repeater) to one of the intermediate repeaters, the CPU first checks if a signal $\overline{CDa}$ is a H level. If it is, the CPU sets an output SETa to a L level. This places the FSK modem 100a in a sending condition. When the CPU is not polling, it sets the FSK modem 100a to a received condition by setting the output SETa to a H level.

If the signal $\overline{CD}$ a changes from a H level to a L level, the CPU receives conditional information from FSK modem 100a via RD, and checks the repeater number and line number included in the information (e.g., FIG. 6(d)).

A main memory MM, stores conditional information for each repeater and line (i.e., each amplifier) that has been collected by the CPU over a series of polling operations for each repeater and line (i.e., each amplifier). This conditional information is stored at memory locations set aside for each repeater and line. The CPU also collects error monitor information from its own amplifying circuits by operating the switch SW (FIG. 7). The collected conditional information is stored in the main memory MM via a common bus.

Terminal repeater LTE0 (FIG. 14) functions, as noted above, as a supervisory terminal repeater. The repeater LTE0 includes a keyboard KB and a display unit (CRT controller, and CRT display). An operator uses the keyboard to send commands to the CPU of the LTE0 via I/O interface 1 and the common bus. Any conditional information for an amplifier within a particular repeater of the system can be accessed. Conditional information relating to the status of each amplifier or part of the system is collected and stored in the main memory MM. The collected conditional information can be displayed on the CRT via the common bus and I/O interface 2.

As explained above, the present invention provides the advantages that (1) an error monitor can be utilized for repeaters while they are in a normal, in-service condition, (2) the supervisory line length can be extended since each repeater transmits a received signal to the next repeater, (3) there is no restriction on the number of frequencies as in the existing system, since a particular repeater and line (i.e., an amplifier) within the repeater are designated by an address instead of a frequency, and (4) the present invention is compatible with the pulse trio system used in existing systems.

What is claimed is:

1. A supervisory system for a primary group digital transmission line comprising:
    terminal repeater means for receiving and transmitting multiplexed signals, for transmitting address information and for receiving and storing conditional information; and
    a plurality of intermediate repeater means, having a normal, in-service condition, for receiving and transmitting said multiplexed signals, for receiving said address information and for providing, in response to said address information, said conditional information to said terminal repeater means while in said normal in-service condition, said terminal repeater means and said plurality of intermediate repeater means each include:
    a plurality of amplifier means for receiving, amplifying and transmitting said multiplexed signals, and for providing a monitor output signal;
    switching means for providing a monitor output signal of a designated one of said plurality of said amplifier means in accordance with said address information; and
    error monitor means, for receiving said monitor output signal and for providing a coded output representing an error rate of said monitor output signal provided by said switching means.

2. A supervisory system for a primary group digital transmission line according to claim 1, further comprising a supervisory line, and wherein each of said intermediate repeater means further includes:
    interface means, operatively connected to said supervisory line, for receiving said address information from said supervisory line, said interface means of said intermediate repeaters being cascade connected via said supervisory line; and
    first processor means, operatively connected to said interface means, to said error monitor means and to said switching means, for receiving said address information and for providing said address information to said switching means, for receiving said coded output, for providing said conditional information representative of said coded output to said interface means and for sending said address information received from said interface means to another intermediate repeater means.

3. A supervisory system for a primary group digital transmission line according to claim 2, wherein said terminal repeater means further includes:
    second processor means for providing said address information to said supervisory line and for receiving said conditional information from said supervisory line; and
    memory means for storing said conditional information.

4. A supervisory system for a primary group digital transmission line according to claim 3, wherein said second processor means includes means for sequentially providing said address information, and wherein said memory means stores a plurality of said conditional information for each of said plurality of intermediate repeater means and said terminal repeater means.

* * * * *